United States Patent [19]
Luck

[11] 3,878,080
[45] Apr. 15, 1975

[54] CARBON MONOXIDE SENSOR
[75] Inventor: James R. Luck, Burnsville, Minn.
[73] Assignee: Honeywell Inc., Minneapolis, Minn.
[22] Filed: Sept. 9, 1974
[21] Appl. No.: 504,012

[52] U.S. Cl............................. 204/195 P; 204/1 T
[51] Int. Cl. ........................................... G01n 27/46
[58] Field of Search............. 204/1 T, 195 R, 195 P, 204/195 B

[56] References Cited
UNITED STATES PATENTS
| | | | |
|---|---|---|---|
| 3,239,444 | 3/1966 | Heldenbrand | 204/195 P |
| 3,510,420 | 5/1970 | Mills | 204/195 P |
| 3,542,662 | 11/1970 | Hicks et al. | 204/195 P |
| 3,574,078 | 4/1971 | Hynes et al. | 204/195 P |

Primary Examiner—T. Tung
Attorney, Agent, or Firm—Charles G. Mersereau

[57] ABSTRACT

A novel electrochemical cell adapted to be used in determining the concentration of small quantities of carbon monoxide in a fluid medium by an oxygen-depletion method is disclosed in which oxygen is transported into the cell through a quantity of a stable hemeprotein compound which, at normal ambient temperatures, is capable of reversibly binding molecular oxygen but preferentially binds molecular carbon monoxide, thus reducing the oxygen transported to the cell.

3 Claims, 4 Drawing Figures

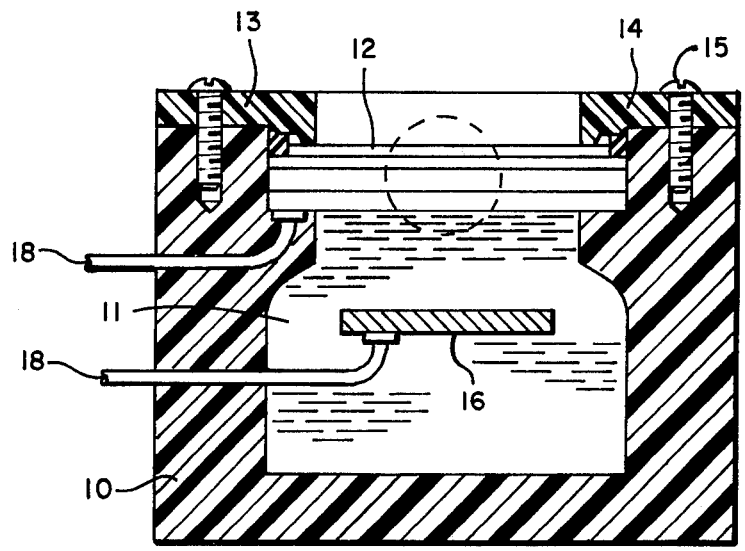
FIG. 1
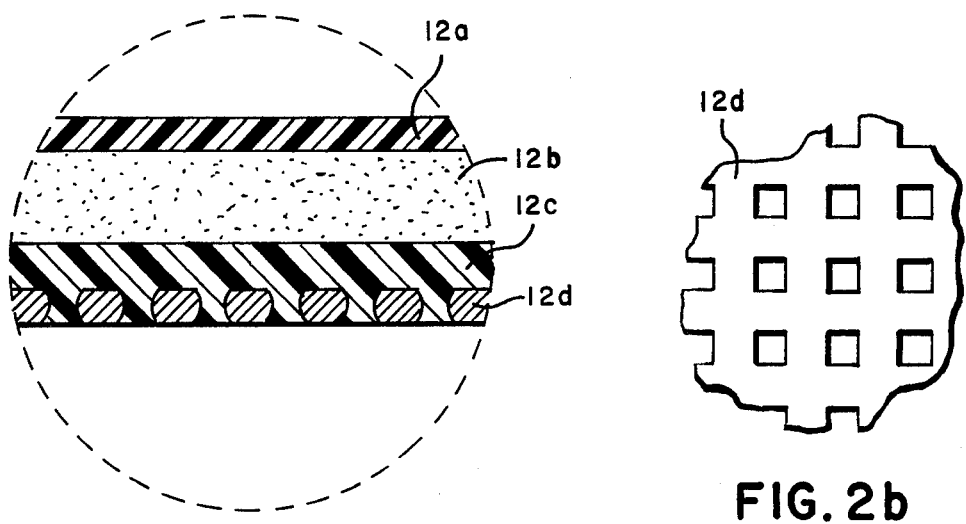
FIG. 2a
FIG. 2b
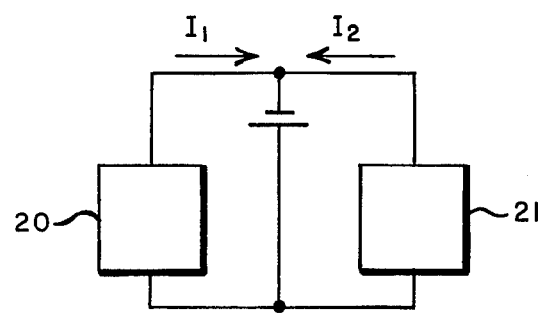
FIG. 3

CARBON MONOXIDE SENSOR

BACKGROUND OF THE INVENTION

1. Field of the Invention

The present invention relates broadly to improvements in electrochemical cells of the type used to determine quantitative amounts of a gas dissolved in a liquid or in a mixture of gases. More particularly, the invention is concerned with an improved oxygen-depletion carbon monoxide sensor which utilizes a unique oxygen transport medium.

2. Description of the Prior Art

Electrochemical cells of the type involved may be constructed either as galvanic or polarographic cells. In the former type of cell, the electrodes and electrolyte are selected such that when the measuring electrode is exposed to the electroactive species sought to be determined, the resulting reaction causes a current to flow spontaneously without the application of external voltage in the system. The current is a function of the amount of such electroactive species present. In the latter type cell, a predetermined external voltage is impressed across the electrodes which, in the absence of the electroactive species sought to be determined, polarizes the system reducing the cell current substantially to zero. Thereafter, when the measuring or polarizing electrode is exposed to the electroactive species a current flows which is a function of the concentration of the electroactive species sought to be determined in the medium analyzed.

Such cells generally include an electrolyte, a measuring or polarizing electrode and a reference electrode.

In such cells as used to detect a gas in a gaseous mixutre, normally the electroactive surface of the cathode is separated from the external environment by a membrane which is permeable to the species sought to be determined. Thus, the molecules of the gas of interest diffuse through the membrane in proportion to their concentration in the external environment to react at the surface of the cathode. This produces a signal in the form of electrical current having a level which is directly proportional to the reaction rate and thus, to the concentration of the electroactive molecules of the gas of interest in the external gaseous mixture. Proper specificity regarding a molecular species to be sensed by the detector is achieved by selecting the proper combination of semi-permeable membrane, cathode surface material, electrode potential, electrolyte, and reference electrode. Typically, in a polarographic cell utilized for the detection of oxygen, a reference electrode (anode) of copper-copper sulfide and a measuring electrode (cathode) of gold or platinum with an electrolyte consisting of an aqueous solution of sodium sulfide are utilized. Such cells, of course, may be operated in either the amperometric mode, wherein the changes in cell current are indicative of the concentration of the gas of interest in the environment of the cell or in a potentimetric mode, wherein the changes in the cell voltage are indicative of the concentration of the gas of interest. The choice is one of external electrical configuration and those techniques are well-known in the art.

Because of its adverse affect on human health, even in minute quantities, detection of the gas carbon monoxide (CO) the colorless, non-irritating gas generated by incomplete combustion and found in the products of almost any combustion environment from motor vehicle exhaust to tobacco smoke, has become increasingly important. Probably the most selective of CO sensitive compounds are the naturally occurring biological substance such as hemoglobin and myoglobin which are chiefly known for their biological oxygen transport capabilities. These compounds have the unique property of reversibly binding molecular oxygen but, in the presence of CO, the CO is preferentially and more tightly bound. The high CO selectivity of these compounds is derived from their much greater affinity for CO than for $O_2$ which correspondingly reduces the $O_2$ transport capability. However, because of the relatively short-lived nature of these natural compounds when found outside of their biological environment, it has heretofore been impossible to utilize such compounds in a practical carbon monoxide analyzing device. The recent discovery of a class of synthetic compounds which are stable at ordinary temperatures and exhibit the same properties with regard to both oxygen and carbon monoxide has now made such a device practical.

SUMMARY OF THE INVENTION

According to the present invention, an electrochemical oxygen-sensing cell is provided with a unique oxygen transport medium between the external environment containing the gas to be analyzed and the electrochemical oxygen-sensing system which is both extremely sensitive and selective to the presence of CO in that gas. The oxygen-transport medium comprises a synthetic hemeprotein which is stable and capable of reversibly binding molecular oxygen in the manner of hemoglobin or myoglobin at ordinary ambient temperatures and which also preferably binds carbon monoxide. The hemeprotein is admixed with a compound such as glycerin, for example, which does not affect the hemeprotein and is otherwise substantially impervious to oxygen and/or carbon monoxide. Thus, the only mechanism for transporting the oxygen from the outside environment to the electrochemical oxygen-sensing system is through the hemeprotein reversibly binding mechanism. The synthetic transport medium is normally sandwiched between non-conducting, oxygen-permeably layers of material such as tetrafluoroethylene polymer or fluorinated ethylene-propylene to preserve its integrity and allow the cell to be operated in any position. The zero operating point of the electrochemical cell of the invention is calibrated based on the sensing of the background oxygen level of the sample gas as, for example, in air. The presence of even minute amounts of carbon monoxide in the atmosphere causes a proportional decrease in the oxygen transport capabilities of the hemeprotein which causes a corresponding drop in the current or voltage of the electrochemical cell. (As the cell may be operated either in the amperometric or potentiometric mode, the measurement may be made either in terms of the voltage or current output of the cell.) Cells of this nature have been found to be extremely sensitive, even amounts such as a very few parts per million of carbon monoxide in the air being tested can readily be detected. Thus, even a concentration of only 100 ppm of carbon monoxide reduces the oxygen carrying capability of the hemeprotein by about 15%. This, of course, causes a corresponding decrease in the cell output.

The electrochemical cell of the present invention is preferably operated in the amperometric mode and, as is true of all electrochemical sensors of the type described, the measurement obtained is somewhat dependent upon the temperature, oxygen concentration, etc. of the environment in which it is used. Therefore, in order to cancel the effect of changes in temperature, background oxygen concentration and other possible interferring effects, two sensors, one with and one without the hemeprotein layer, are normally used. The two cells are wired to be in opposition such that the net current represents the difference between the current in the cell utilizing no hemeprotein layer and the one using the hemeprotein layer. This difference then is a direct function of the amount of CO present as the interferring effects are cancelled out by the utilization of two opposing cells.

BRIEF DESCRIPTION OF THE DRAWINGS

In the drawings:

FIG. 1 is a vertical sectional view through a typical electrochemical cell utilizing the oxygen transport layer of the present invention.

FIG. 2a is an enlarged fragmentary view of the composite structure within the circle designated in FIG. 1;

FIG. 2b is a horizontal sectional view showing a measuring electrode which may be used with the cell of the present invention, and FIG. 3 is a schematic diagram of a method of utilizing the cell of the present invention.

DESCRIPTION OF THE PREFERRED EMBODIMENT

In FIG. 1, there is illustrated an electrochemical cell for determing the concentration of oxygen in a liquid or gas. The cell itself is typical of cells utilized for electrochemical detection of species such as oxygen in a mixture of gas and it comprises of hollow body 10, which may be generally cylindrical in shape, and which defines an inner chamber 11 containing the electrolyte, normally a solution of an alkali metal sulfide or other suitable ionizable species.

The multi-layer diffusion medium of the invention 12 is disposed across an opening in the cell body 10 and held in liquid-tight relation as by a seal provided about the periphery of the membrane. Thus, a conventional O-ring 13 held in a sealing position by a retainer ring and fixed to the cell body 10 as by screws 15 may be used. While the membrane barrier 12 is impervious to the passage of liquid in either direction, i.e. loss of electrolyte from the cell or entrance of external liquid into the cell, it is permeable to oxygen in a manner described in greater detail below. An anode or reference electrode 16, which may be made of any metal anode material providing a compatible combination with the electrolyte is located in the chamber 11. Thus, for example, a copper-copper sulfide anode and an electrolyte of an alkali metal sulfide solution may provide such a combination. The anode is normally spaced a small distance from the innermost surface of the membrane 12.

As shown in greater detail in FIGS. 2a and 2b, the innermost layer of the multi-layered membrane 12 may contain the second electrode or cathode as at 12d. Electrical leads as at 17 and 18 are utilized to connect the cathode or measuring electrode 12a and the anode or reference electrode 16, respectively, into the external electrical measuring system as desired.

FIG. 2a depicts in greater detail the multi-layered structure of the diffusion medium 12. The medium consists of an outer layer 12a, the oxygen transport layer 12b and an inner carrier layer 12c in which the cathode or measuring electrode 12d may be carried. The layers 12a and 12c should be constructed of chemically inert, dialectric materials which are permeable to oxygen but impervious to the passage of liquid. In addition, the layer 12a must be permeable to carbon monoxide. Thus, such compounds as polyethylene, polypropylene, tetrafluorethylene polymer or fluorinated ethylenepropylene copolymer may be successfully used.

In the preferred embodiment, the electrode number 12d is in the form of a fine mesh screen, normally gold, having a thickness of about 0.2 to about 0.3 mils and about 300 mesh. Such screen is available from several manufacturers including the Buckbee Mears Co., St. Paul, Minnesota. While gold is used for the electrode in the preferred embodiment, any metal satisfactory for such purpose can be used. The noble metals, however, are preferred because of their ability to resist corrosion. It has also been found that the mesh screen structure provides the maximum, most uniform contact both with the electrolyte and the diffusing gas to increase the speed of the reduction reaction at the cathode.

The most important aspect of the present invention is the addition of the oxygen transport layer 12b. That layer consists of a quantity of a hemeprotein species which is capable of reversibly binding molecular oxygen but which preferentially binds carbon monoxide. The naturally occurring biological compounds hemoglobin and myoglobin, it is known, work successfully in a layer with glycerin, for example, to achieve the desired transport. Because of the rapid deterioration of these natural compounds outside of their biological environment, however, they are not suitable for use in detection instrumentation. Therefore, the preferred embodiment uses a synthetic equivalent to achieve the necessary stability.

A great deal of work is presently being carried out in an effort to produce a variety of synthetic compounds which behave chemically like hemoglobin and myoglobin, i.e., which can reversibly bind molecular oxygen either in gaseous form or in solution wherein the oxygen binds to an iron (II) atom in the center of a porphyrin ring without oxidizing the iron (II) or reducing the molecular oxygen. Research to date indicates that this iron-porphyrin complex, known as a "heme", can accomplish its reversible molecular oxygen binding only in the presence of a more complicated, larger group having a protein structure. These compounds, like the naturally occurring ones, are also known as "hemeproteins." In addition to the reversible binding of molecular oxygen, the iron (II) complex of the synthetic hemeproteins preferentially binds carbon monoxide in a less reversible combination.

At the present time, most of the compounds having the desired properties which have been successfully synthesized are severely temperature limited in their ability to bind molecular oxygen without oxidizing the iron (II) atom. Thus, several compounds have been developed which exhibit these properties at temperatures below about −45°C. This, of course, is beyond the practical temperature limitations of the electrochemical cell of the present invention.

At least one compound has been developed, however, which reversibly binds oxygen and preferentially binds carbon monoxide in the stable condition without oxidizing the iron (II) binding site and which is also stable at room temperature. The compound has the iron (II) atom within a modified porphyrin ring which is complexed with 1-methylimidazole. This molecule will reversibly bind oxygen at room temperature but will preferentially bind carbon monoxide at the iron (II) site. While this is the only stable synthetic compound known to the applicants at this time, it is anticipated that similar compounds will become available which could readily be substituted for that compound in the layer 12b of the electrochemical cell of the present invention.

The oxygen transport compound utilized in the layer 12b must be disposed such that no gaseous species i.e., oxygen or carbon monoxide can pass through the layer other than by complexing with the transport medium. Thus, by mixing the compound with such gas-impervious materials as glycerin or the like this may be accomplished. In order that transport be accomplished in the least possible time, thereby decreasing the period required for response of the electrochemical cell to a change in the composition of the external environmental atmosphere being measured, the layers 12a, 12b and 12c are normally made quite thin i.e., two mils or less.

The electroformed screen 12d is normally pressed into the layer 12c prior to assembly of the remainder of the layers in the composite diffusion medium 12. The layers may then be assembled together and held in place over the cell opening as by cover 14.

In operation, oxygen in the environment to be measured diffuses through the layer 12a, is picked up by the reversible binding of the complex in 12b and is carried to a point where it again detaches and diffuses through the layer 12c to be reduced at the gold cathode 12d. The cell will soon reach normal equilibrium condition for any given atmosphere to which it is exposed. The presence of carbon monoxide, however, will cause a drastic reduction in the ability of the layer 12b to transport oxygen because the iron (II) site will preferentially attach to the carbon monoxide molecules thereby inhibiting this oxygen transport. It has been found that only 100 ppm of carbon monoxide will reduce the transport capabilities of the layer by as much as 15%. Utilizing this reduction in oxygen reacting in the electrochemical cell as a basis, the instrument can be made to read directly in percent carbon monoxide, i.e. parts per million carbon monoxide, et., by calibration in terms of voltage or current produced for a given degree of inhibition.

As with most electrochemical cells of the type described, the ambient temperature, variations in oxygen concentration in the gas to be measured and other effects may interfere with the precise calibration. However, by using two sensors 19 and 20 (FIG. 3) one of which includes the layer 12b and the other of which has only the gas diffusion layers 12a and 12c, the effects other than the transport inhibition produced in the layer 12b, can be cancelled. As shown in FIG. 3, this may be accomplished by applying the currents (ac voltages) produced by the cells (in reaction to the presence of oxygen) in opposition to one another such that they will cancel out until the time that the presence of carbon monoxide in the sample atmosphere produces a corresponding reduction in the output of the cell having the layer 12b.

If the cell 20 is designated as the one without the layer 12b and the cell 21, as the one with the layer 12b of the invention, then the concentration of CO in any gaseous mixture can readily be determined and the combined instrument calibrated as a function of the difference in $I_1$ and $I_2$ (FIG. 3) as follows:

$CO = K [I_1 - I_2]$ where $K$ is a constant which can experimentally be determined.

The embodiments of the invention in which an exclusive property or right is claimed are defined as follows:

1. In an electrochemical cell adapted to be used in determining the concentration of carbon monoxide in a fluid medium comprising:

a cell chamber having an opening across at least a portion of one surface thereof;

a reference electrode disposed within said chamber in gas-tight isolation from the environment external to said chamber other than by said opening;

an electrolyte solution in said chamber in communication with said reference electrode and said opening;

a measuring electrode also disposed within said chamber in gas-tight isolation from the environment external to said chamber other than by said opening and in communication with said electrolyte; and, electrical leads attached to each of said electrodes; the improvement comprising;

a gas permeable composite membrane member in generally sheet form disposed in liquid-tight relation with and closing said opening in said chamber, said composite membrane member comprising three layers;

an outer layer including an oxygen and carbon monoxide-permeable, non-conducting membrane member in generally sheet form;

a central oxygen transport layer comprising a quantity of a stable hemeprotein compound, which at normal ambient temperatures is capable of reversibly binding molecular oxygen but which preferentially binds carbon monoxide contained in a medium impermeable to oxygen other than by said hemeprotein;

an inner oxygen-permeable member in generally sheet form in liquid-tight engagement with said inner portion of cell.

2. The electrical chemical cell of claim 1, wherein said stable hemeprotein compound is an iron complex.

3. The electrical chemical cell of claim 2 wherein said stable hemeprotein is characterized by a central iron (II) atom within a modified porphyrin ring and complexed with a 1-methylimidazole.

* * * * *